(12) United States Patent
McGuire et al.

(10) Patent No.: US 6,451,410 B1
(45) Date of Patent: Sep. 17, 2002

(54) FLEXIBLE, CUT RESISTANT, AND ABRASION RESISTANT SHEET MATERIAL AND METHOD FOR MAKING SAME

(75) Inventors: Kenneth Stephen McGuire, Wyoming; Peter Worthington Hamilton; Richard Tweddell, III, both of Cincinnati; Richard Emil Hildebrand, IV, West Chester; Geneva Gail Otten, Cincinnati, all of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/358,136

(22) Filed: Jul. 20, 1999

Related U.S. Application Data

(63) Continuation-in-part of application No. 09/336,495, filed on Jun. 18, 1999, now abandoned.

(51) Int. Cl.[7] .............................. B32B 3/28; B29C 35/08
(52) U.S. Cl. .................... 428/156; 428/131; 428/480; 428/409; 428/141; 264/435; 264/494; 264/496; 264/495; 264/285; 264/286
(58) Field of Search ................................. 428/131, 156, 428/480, 409, 141; 264/435, 494, 496, 495, 285, 286

(56) References Cited

U.S. PATENT DOCUMENTS

| | | | | |
|---|---|---|---|---|
| 4,557,963 A | * | 12/1985 | Caines | 156/220 |
| 4,975,358 A | * | 12/1990 | Sonnenschein et al. | 430/495 |
| 5,008,332 A | * | 4/1991 | Sano et al. | 525/92 |
| 5,411,805 A | * | 5/1995 | Magill | 428/411.1 |
| 5,733,628 A | * | 3/1998 | Pelkie | 428/138 |
| 5,965,235 A | | 10/1999 | McGuire et al. | |
| 6,274,232 B1 | | 8/2001 | Otten et al. | |

* cited by examiner

Primary Examiner—William P. Watkins, III
(74) Attorney, Agent, or Firm—Peter D. Meyer; Leonard W. Lewis

(57) ABSTRACT

The present invention provides a sheet of crystallizable material, having opposed first and second surfaces, the sheet comprising: (a) a plurality of crystalline regions located in the first surface; and (b) an amorphous matrix surrounding and separating the crystalline regions from one another. The present invention also provides a method of making a flexible, cut resistant, and abrasion resistant sheet material, the method comprising the steps of: (a) providing a sheet of crystallizable amorphous material having opposed first and second surfaces; (b) crystallizing discrete regions of the first surface of the sheet of material, the discrete regions being separated from one another by a continuous amorphous matrix.

18 Claims, 2 Drawing Sheets

FLEXIBLE, CUT RESISTANT, AND ABRASION RESISTANT SHEET MATERIAL AND METHOD FOR MAKING SAME

CROSS-REFERENCE TO RELATED APPLICATION

This is a continuation-in-part of our commonly-assigned, co-pending prior application Ser. No. 09/336,495, filed Jun. 18, 1999 abandoned.

FIELD OF THE INVENTION

The present invention relates sheet materials which are not only flexible, but also cut resistant and abrasion resistant. The present invention further relates to methods for manufacturing such sheet materials.

BACKGROUND OF THE INVENTION

For many applications, sheet materials having durable wear and tear characteristics such as cut resistance and abrasion resistance are desirable. One such example is the use of protective sheet materials for countertops during food preparation operations. For this example and many others, however, it is often desirable that the sheet material also be flexible to conform to irregular and/or non-planar supporting surfaces and to be more easily stored, dispensed, and manipulated during use.

For this reason, many materials which are highly cut and abrasion resistant are less than desirable due to the lack of flexibility and conformability typically inherent with such materials. The reverse is also true, as many materials which are highly flexible and conformable are less than desirable due to the lack of cut and abrasion resistance typically inherent with such materials.

In recognition of these issues, certain composite and/or laminate materials have been developed which combine components exhibiting each of the desirable properties into a coherent structure with overall properties generally intermediate those of each material separately. While such materials may be suitable for certain applications, the points or regions of joinder between diverse materials frequently become points or regions of vulnerability to detachment when the sheet material is subjected to cutting or abrasion forces or repeated flexing under in-use conditions.

Accordingly, it would be desirable to provide multiple diverse properties such as cut resistance, abrasion resistance, and flexibility in a unitary material structure.

It would also be desirable to provide such a material which is durable, in use.

It would further be desirable to provide such a material which may be readily and economically manufactured.

SUMMARY OF THE INVENTION

The present invention provides a sheet of crystallizable material having opposed first and second surfaces, the sheet comprising: (a) a plurality of crystalline regions located in the first surface; and (b) an amorphous matrix surrounding and separating the crystalline regions from one another. The present invention also provides a method of making a flexible, cut resistant, and abrasion resistant sheet material, the method comprising the steps of: (a) providing a sheet of crystallizable amorphous material having opposed first and second surfaces; (b) crystallizing discrete regions of the first surface of the sheet of material, the discrete regions being separated from one another by a continuous amorphous matrix.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
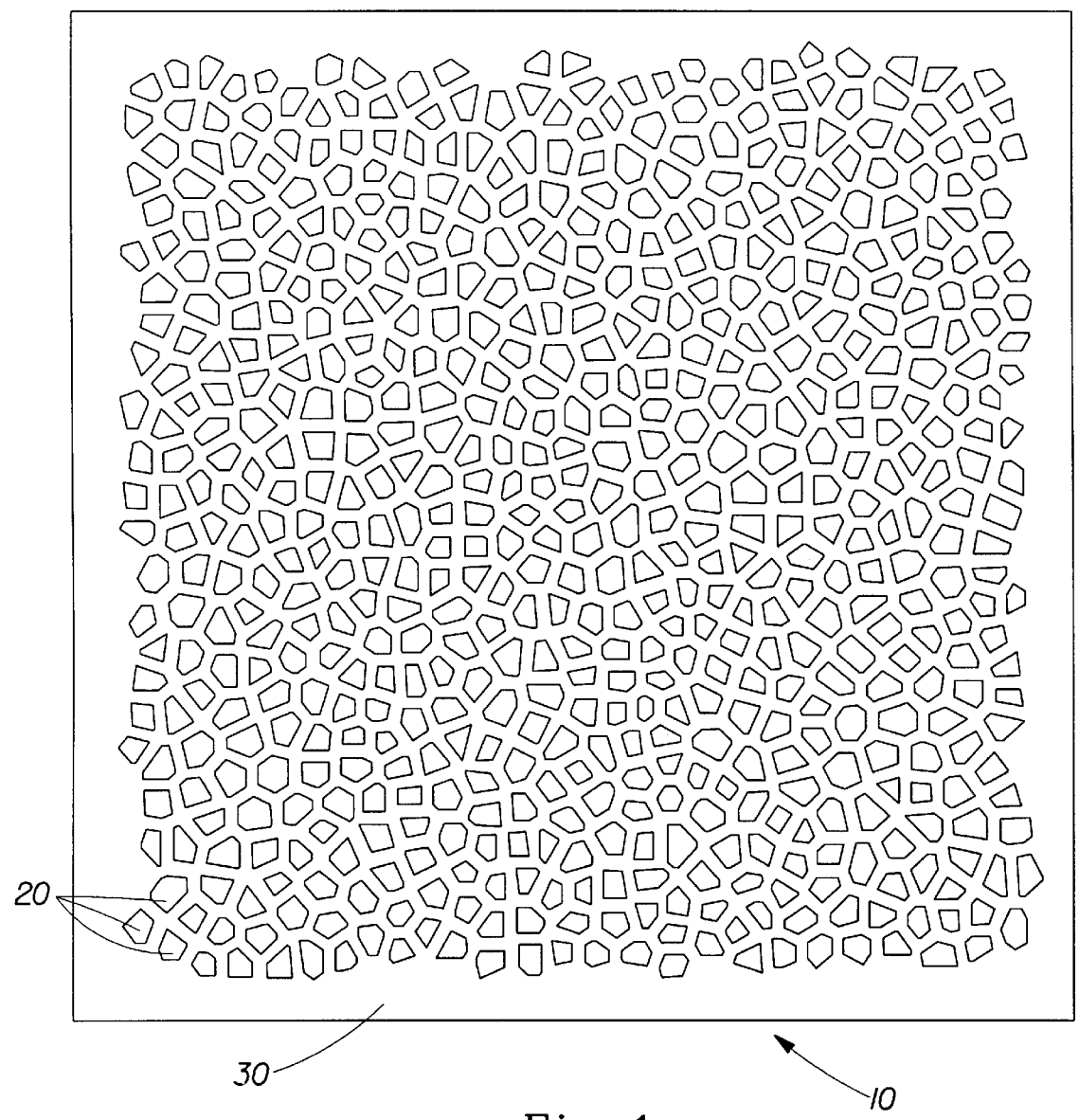
FIG. 1 is a plan view of a representative sheet of material in accordance with the present invention.
Figure 2:
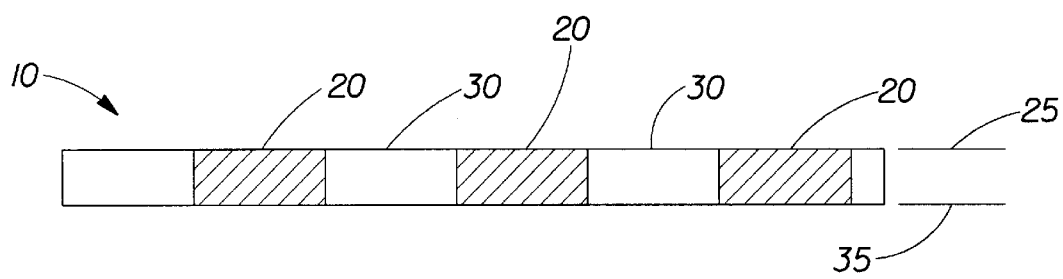
FIG. 2 is an elevational sectional view of the sheet of material of FIG. 1.

FIG. 1 depicts a representative embodiment of a sheet material 10 in accordance with the present invention. As discussed below in greater detail with reference to FIG. 2, the sheet material 10 has a three-dimensional cross-section which includes a plurality of defined regions 20 which are surrounded by and separated from one another by a continuous matrix 30. The sheet 10 has a first surface 25 and an opposing second surface 35, both of which are substantially planar in the embodiment of FIGS. 1 and 2.

The sheet 10 is unitarily formed from a crystallizable material of the desired gauge or thickness and having the desired mechanical and chemical properties. The plurality of regions 20 exhibit crystalline properties and define crystalline regions of the sheet within the first surface. The remainder of the sheet comprises the continuous matrix 30 which surrounds and separates the crystalline regions from one another. In contrast to the crystalline regions, the continuous matrix exhibits substantially amorphous properties and defines an amorphous matrix.

Crystalline regions such as those depicted in FIG. 1 may take any form, size, and arrangement desired, either regular or irregular. For example, the regions may share a common size and/or shape, or may differ from each other. They may also be arranged in a regular repeating array pattern, or may be irregularly arranged. In the embodiment shown in FIG. 1, the regions form an amorphous pattern such as those developed for the prevention of nesting in wound rolls of three dimensional sheet products. Such patterns have been disclosed in U.S. Pat. No. 5,965,235, issued Oct. 12, 1999, in the names of McGuire, Tweddell, and Hamilton, entitled "Three-Dimensional, Nesting-Resistant Sheet Materials and Method and Apparatus for Making Same", the disclosure of which is hereby incorporated herein by reference.

As a general proposition, if a unitary sheet of crystallizable material exhibits a certain degree of flexibility when in an un-crystallized or amorphous state, crystallization of the sheet of material results in a significant reduction in flexibility and may in fact result in a substantially brittle material. At the same time, if the sheet of material exhibits a certain degree of cut resistance and abrasion resistance when in an amorphous state, crystallization of the sheet of material may result in a significant increase in both cut resistance and abrasion resistance.

Figure 4:
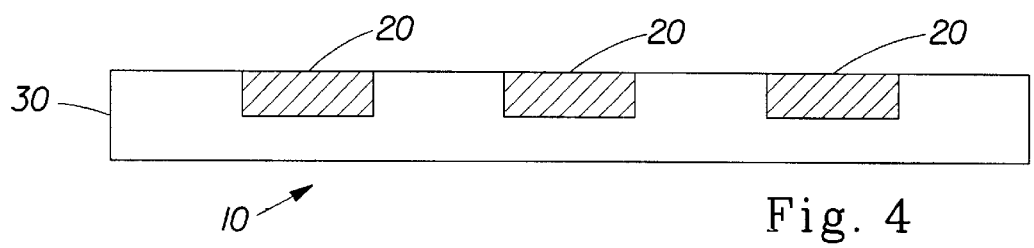
FIG. 4 is an elevational sectional view of a further embodiment of a sheet material in accordance with the present invention.

Therefore, in accordance with the present invention, the sheet material includes a plurality of crystalline regions which exhibit desirable cut resistance and abrasion resistance properties located within an amorphous matrix which exhibits desirable flexibility properties. Such sheets exhibit overall flexibility characteristics intermediate those of a fully crystallized sheet and a fully amorphous sheet. Without wishing to be bound by theory, it is believed that the difference in flexural behavior is proportional to the percent area of the first surface occupied by the crystalline regions, the degree of crystallization, and the degree to which the crystalline regions penetrate the thickness of the sheet as they extend inwardly from the first surface to or toward the second surface. As shown in FIG. 4, the crystalline regions extend inwardly from the first surface toward the second surface a distance less than the thickness of the sheet material, such that the second surface in a location corresponding to the location of the crystalline regions in the first surface remains substantially amorphous in nature, comparable to the amorphous nature of the continuous amorphous matrix. In one limiting case, the crystalline region forms a very thin protective shell over the amorphous material below, while in the other limiting case the crystalline regions fully penetrate the thickness of the sheet and extend throughout the material from the first surface to the second surface.

Figure 3:
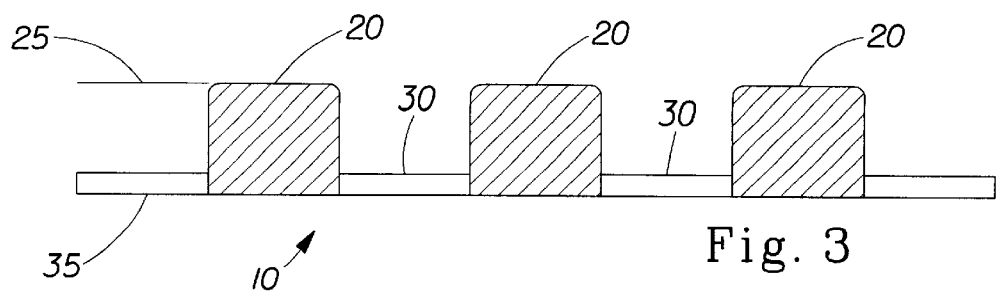
FIG. 3 is an elevational sectional view of another embodiment of a sheet material in accordance with the present invention.

FIG. 3 depicts another embodiment of a sheet material according:, to the present invention. In the embodiment of FIG. 3, the thickness of the sheet material is greater in the crystalline regions 20 than in the continuous amorphous matrix 30, such that the crystalline regions extend upwardly to form a first surface above the continuous amorphous matrix. Said differently, the continuous amorphous matrix is depressed between the crystalline regions to form a network of reduced thickness material, further enhancing the flexibility of the sheet. The second surface, as shown in FIG. 3, remains substantially planar.

Figure 5:
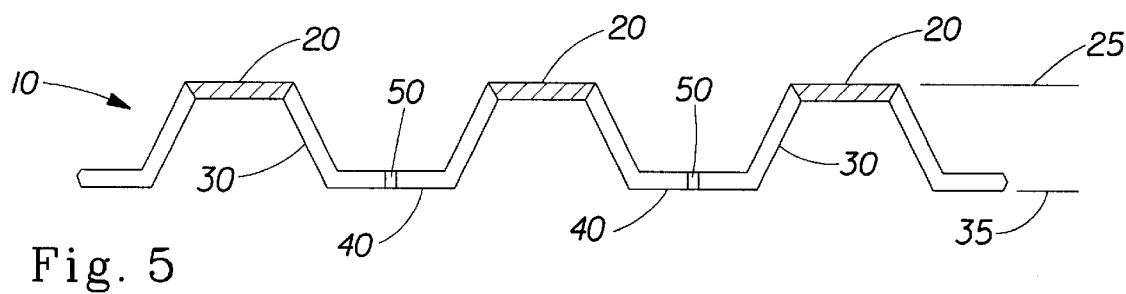
FIG. 5 is an elevational sectional view of yet another embodiment of a sheet material in accordance with the present invention.

FIG. 5 depicts an elevational sectional view of yet another embodiment of a sheet material in accordance with the present invention. In the embodiment of FIG. 5, the continuous amorphous matrix 30 is depressed below the surface formed by the crystalline regions 20 to define a network of valleys 40. Unlike the sheet materials of FIGS. 1–4, the sheet material 10 of FIG. 5 is a three-dimensional macroscopically-expanded sheet material having a caliper much greater than the thickness or gauge of the material from which it is made. In the embodiment of FIG. 5, the valleys 40 have a wall thickness comparable to that of the crystalline regions 20, and the crystalline regions extend substantially fully through the thickness of the material forming the raised portions of the sheet material between the valleys. Depending upon the desired end use for sheet 10, the valleys 40 may optionally include a plurality of apertures 50 to provide a degree of porosity to the sheet, such as to make the sheet fluid pervious.

Without wishing to be bound by theory, it is believed that the three-dimensional nature of the sheet material embodiment of FIG. 5 yields additional flexibility due to the ability of the structure to respond to lower force levels due to the lower bending moment of inertia.

Figure 6:
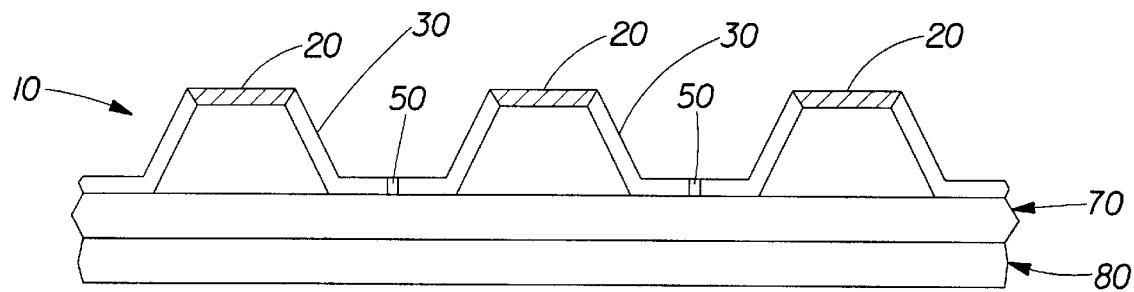
FIG. 6 is an elevational sectional view of the sheet material of FIG. 5 utilized as a protective cover layer in an absorbent composite sheet.

FIG. 6 illustrates one potential application for the sheet materials of the present invention, more particularly, the embodiment of FIG. 5. The sheet material 10 is utilized as a cut resistant and abrasion resistant cover layer in a composite sheet material 60 which includes an absorbent layer 70 and a fluid impervious backing layer 80, each of which may be secured to one another via adhesive or other suitable methods. The apertures 50 provide fluid communication between the surface of the sheet material 10 and the absorbent layer, such that if the composite sheet material is utilized as a cutting surface during food preparation or other tasks the sheet material 10 will protect the absorbent layer 70 yet still provide fluid communication so that fluids released from the food may be absorbed. The backing layer 80 in turn protects underlying surfaces. A more detailed discussion of such composite sheet materials may be found in commonly-assigned, concurrently-filed, co-pending U.S. patent application Ser. No. 09/336,496 abandoned, entitled "Multi-Purpose Absorbent and Cut-Resistant Sheet Materials", the disclosure of which is hereby incorporated herein by reference.

Crystallization of the crystalline regions may be accomplished by any suitable means depending upon the particular material utilized. For example, a thermally-crystallizable material may be crystallized by the addition of external heat via infrared or laser impingement devices. The thermal impingement device may be precisely focused on discrete regions, or a mask may be employed to block the thermal energy from certain areas of the material. The material may also be conductively heated.

Figure 7:
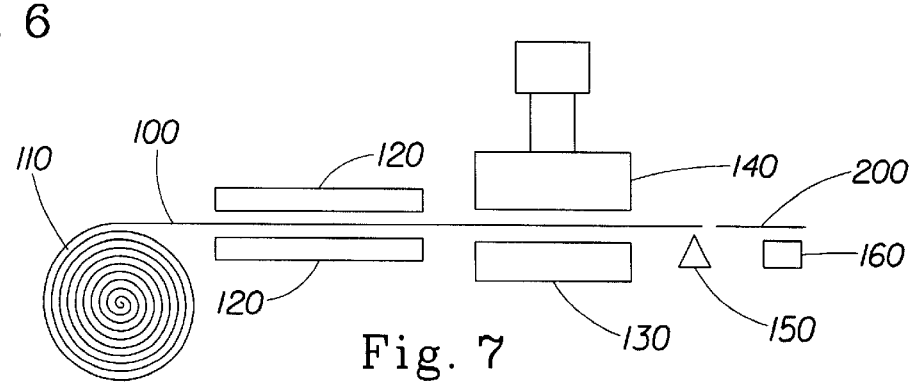
FIG. 7 is a schematic illustration of a process suitable for manufacturing the sheet material of FIG. 5.

FIG. 7 illustrates one suitable process for manufacturing a sheet material in accordance with the embodiment of FIG. 5. In the process of FIG. 6, the formed polyethylene terepthalate (PET) sheet is be made by a process commonly called "pressure forming." In pressure forming, the starting material 100 (preferably 0.010" thick amorphous PET) is fed from a supply roll 110 and heated until it is soft with an infrared or hot air heat source 120. The heated sheet is then passed between the mold 130 and a pressure box 140. The pressure box clamps against the film and the mold, and then pressure is applied to the film. Because the mold has a number of small holes drilled through it, air escapes from between the film and the mold, and the film conforms to the mold shape. After the film cools, it is removed from the mold and is preferably cut into sheets 200 via sheeting cutter 150. The final step of crystallizing the tops of the lands is accomplished by heating the tops of lands above the glass transition point of the PET and holding this temperature while crystallization occurs. This can be accomplished with a hot iron, hot roller, or by obliquely directed infrared radiation at station 160.

In some applications, the sheet may need to be fluid pervious. In the pressure forming process, "dimples" are formed in the bottom of the grooves because the film is drawn down into the air passage holes in the mold. These dimples can be skived off with, for example, a spinning blade as might be found in a common wood planer. After the skiving operation, the sheet will have holes in the bottoms of the grooves allowing fluid passage.

Depending upon the desired application for the sheet materials of the present invention, it may be desirable to modify one or more surface regions of the sheet material to improve the aesthetic appearance and tacile impression presented to a consumer to thereby improve the consumer acceptance of such sheet materials. For example, in many circumstances the outward surfaces of the. sheet materials may appear and feel comparatively smooth and shiny, and thereby "plastic-like". It may therefore be desirable for such applications to modify the surface to reduce the "plastic-like" impression and make the surface more "natural" and aesthetically pleasing.

Representative approaches for such surface modification include providing an embossed (or debossed) "microtexture" or other fine-scale texturing superimposed on and unitarily formed with the land areas of the sheet material. Such texturing serves to scatter reflected light and create a matte surface finish, and may be accomplished in a number of ways such as embossing with a male or female surface, sanding, sandblasting, etching with a chemical, etc. Another representative approach is the use of a sheet or other web externally applied to and laminated to the upper surface of the sheet material. This laminated sheet may be a woven, nonwoven, formed film, expanded film, or other essentially two-dimensional substrate that essentially bonds to the sheet material to reduce the gloss and interrupt the smooth tactile impression of the sheet. Light scattering may be the means of reducing the gloss, but other techniques may be employed such as color differences between the sheet material and the laminated sheet. Particles and/or fibers added to the outwardly-facing surface of the sheet material may also serve to change the surface gloss and/or tactile impression. These particles and/or fibers may be of organic or inorganic origin and may be directly adhered (by melt fusion) or indirectly adhered by use of an intermediate adhesive. The particles and/or fibers are preferably adhered to the uppermost surface of the sheet material, and in the case of a three-dimensionally formed sheet material, may be applied to the valley regions as well as the land regions. The foregoing surface modification approaches may be employed prior to, during, or after the crystallization steps or the three-dimensional forming steps are accomplished.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A flexible sheet of crystallizable material having opposed first and second surfaces, said flexible sheet comprising:
   (a) a plurality of crystalline regions located in said first surface;
   (b) an amorphous matrix surrounding and separating said crystalline regions from one another; and,
   wherein said flexible sheet is formed into a three-dimensional structure having a caliper substantially greater than the thickness of the material from which it is made.

2. The sheet of claim 1, wherein said crystalline regions are separated from one another by valleys formed by said amorphous matrix.

3. The sheet of claim 1, wherein said crystalline regions are arranged to form a regular ordered pattern in said first surface.

4. The sheet of claim 1, wherein said crystalline regions are arranged to form an amorphous pattern in said first surface.

5. The sheet of claim 1, wherein said crystalline regions extend from said first surface to said second surface.

6. The sheet of claim 1, wherein said crystalline regions extend from said first surface inwardly into said sheet a distance less than the thickness of said sheet, such that a region of said second surface corresponding to said crystalline region exhibits amorphous characteristics.

7. The sheet of claim 1, wherein said sheet comprises polyethylene terepthalate.

8. The sheet of claim 1, wherein said crystalline regions form an amorphous pattern.

9. The sheet of claim 1, wherein said sheet includes a plurality of apertures such that said sheet is fluid pervious, said sheet further including an absorbent layer adjacent said second surface and a fluid impervious backing sheet adjacent said absorbent layer.

10. The sheet of claim 1, wherein said first surface is textured.

11. The sheet of claim 10, wherein said first surface includes unitarily formed texturing.

12. The sheet of claim 10, wherein said first surface includes externally applied texturing.

13. A method of making a flexible, cut resistant, and abrasion resistant sheet material, said method comprising the steps of:
    (a) providing a sheet of crystallizable amorphous material having opposed first and second surfaces;
    (b) three-dimensionally macroscopically expanding said sheet material; and,
    (c) crystallizing discrete regions of said first surface of said sheet of material, said discrete regions being separated from one another by a continuous amorphous matrix.

14. The method of claim 13, further including the step of rendering said sheet of material fluid pervious.

15. The method of claim 13, wherein said crystallized regions extend fully between said first and second surfaces.

16. The method of claim 13, wherein said crystallized regions on said first surface overlie regions of amorphous material on said second surface.

17. The method of claim 13, further including the step of texturizing said first surface.

18. The method of claim 17, wherein said texturing step includes the addition of additional materials to said first surface.

* * * * *